United States Patent
Huang et al.

(10) Patent No.: US 8,719,258 B2
(45) Date of Patent: May 6, 2014

(54) INFORMATION SHARING IN AN ONLINE COMMUNITY

(75) Inventors: Wen Carol Huang, Taipei (TW); Chung-Li Aliku Hsiao, Taipei (TW); I-Hsiu Annie Chai, Taipei (TW)

(73) Assignee: Yahoo! Inc., Sunnyvale, CA (US)

( * ) Notice: Subject to any disclaimer, the term of this patent is extended or adjusted under 35 U.S.C. 154(b) by 461 days.

(21) Appl. No.: 12/195,342

(22) Filed: Aug. 20, 2008

(65) Prior Publication Data

US 2010/0049697 A1    Feb. 25, 2010

(51) Int. Cl.
*G06F 17/30* (2006.01)
*G06F 7/00* (2006.01)

(52) U.S. Cl.
USPC .......................................... 707/722; 707/738

(58) Field of Classification Search
CPC ..................... G06F 17/30675; G06F 17/30899
USPC .......... 707/722, 732, 738, 608, 796; 705/300; 709/206
See application file for complete search history.

(56) References Cited

U.S. PATENT DOCUMENTS

| | | | | |
|---|---|---|---|---|
| 5,823,879 | A * | 10/1998 | Goldberg et al. | 463/42 |
| 5,880,731 | A * | 3/1999 | Liles et al. | 715/758 |
| 6,301,609 | B1 * | 10/2001 | Aravamudan et al. | 709/207 |
| 6,308,175 | B1 * | 10/2001 | Lang et al. | 707/608 |
| 6,487,583 | B1 * | 11/2002 | Harvey et al. | 709/204 |
| 6,651,053 | B1 * | 11/2003 | Rothschild | 707/770 |
| 6,745,178 | B1 * | 6/2004 | Emens et al. | 707/741 |
| 6,785,671 | B1 * | 8/2004 | Bailey et al. | 705/26.81 |
| 6,983,370 | B2 * | 1/2006 | Eaton et al. | 713/182 |
| 7,089,264 | B1 * | 8/2006 | Guido et al. | 707/999.003 |
| 7,200,590 | B2 * | 4/2007 | Everett-Church et al. | 709/203 |
| 7,363,295 | B2 * | 4/2008 | Szeto et al. | 707/707 |
| 7,386,798 | B1 * | 6/2008 | Heikes et al. | 715/752 |
| 7,676,466 | B2 | 3/2010 | Terrill et al. | |
| 7,730,030 | B1 * | 6/2010 | Xu | 707/617 |
| 7,739,038 | B2 * | 6/2010 | Coch et al. | 701/208 |
| 7,827,176 | B2 * | 11/2010 | Korte et al. | 707/733 |
| 8,005,823 | B1 * | 8/2011 | Marshall et al. | 707/721 |
| 2003/0191656 | A1 * | 10/2003 | Staples | 705/1 |
| 2004/0215731 | A1 * | 10/2004 | Tzann-en Szeto | 709/207 |
| 2004/0267625 | A1 * | 12/2004 | Feng et al. | 705/26 |
| 2006/0026147 | A1 * | 2/2006 | Cone et al. | 707/3 |

(Continued)

FOREIGN PATENT DOCUMENTS

| | | |
|---|---|---|
| CN | 101189608 A | 5/2008 |
| JP | 2002-259589 A | 9/2002 |

(Continued)

OTHER PUBLICATIONS

International Search Report and Written Opinion for Int. Appl. No. PCT/US2009/053601 dated Mar. 25, 2010, 10 pages.

(Continued)

*Primary Examiner* — Pavan Mamillapalli (74) *Attorney, Agent, or Firm* — Pillsbury Winthrop Shaw Pittman LLP (57) ABSTRACT

A system and method which may allow users, who are looking for similar products or services on a website and thus belong to an online community, to directly communicate with each other. The method may be used in eCommerce, e.g., online shopping or online auction. The method may also be used in other contexts, such as social networking and online photo albums.

21 Claims, 12 Drawing Sheets

(56) References Cited

U.S. PATENT DOCUMENTS

| | | |
|---|---|---|
| 2006/0248050 A1* | 11/2006 | Brooks et al. .................... 707/3 |
| 2007/0033175 A1 | 2/2007 | Everett-Church et al. |
| 2007/0073687 A1 | 3/2007 | Terrill et al. |
| 2007/0157108 A1* | 7/2007 | Bishop ......................... 715/771 |
| 2008/0005072 A1 | 1/2008 | Meek et al. |
| 2008/0140650 A1* | 6/2008 | Stackpole ...................... 707/5 |
| 2008/0162231 A1 | 7/2008 | Kahle et al. |
| 2008/0172344 A1* | 7/2008 | Eager et al. .................... 705/80 |
| 2009/0241032 A1* | 9/2009 | Challener et al. ............. 715/751 |
| 2009/0254456 A1* | 10/2009 | Sarbaev et al. ................ 705/27 |

FOREIGN PATENT DOCUMENTS

| | | |
|---|---|---|
| JP | 2007-172490 A | 7/2007 |
| JP | 2008171233 | 7/2008 |
| KR | 1020040089157 | 10/2004 |
| TW | 548558 B | 8/2003 |
| WO | 2010021893 A2 | 2/2010 |
| WO | 2010/021893 A3 | 6/2010 |

OTHER PUBLICATIONS

International Preliminary Report on Patentability received for Interntational Application PCT/US2009/053601 mailed on Mar. 3, 2011, 5 pages.

Office Action Received for Korean Patent Application No. 10-2011-7006202, mailed on Dec. 21, 2012, 4 pages of Korean Office action and 4 Pages of English translation.

Office Action Received for Japanese Patent Application No. 2011-523872, mailed on Nov. 1, 2012, 4 pages of Japanese Office action and 3 Pages of English translation.

European Search Report dated Sep. 5, 2013 in corresponding Eurpoean Patent Application No. 09808620.0.

* cited by examiner

INFORMATION SHARING IN AN ONLINE COMMUNITY

CROSS REFERENCE TO RELATED APPLICATION

The present application is related to the following U.S. Patent Application, which is assigned to the assignee hereof and incorporated herein by reference in its entirety: U.S. patent application Ser. No. 12/195,332, entitled Advertising in an Online Community, and filed concurrently herewith.

BACKGROUND

1. Field of the Invention

The present invention relates to online communities, and more particularly to information sharing in an online community.

2. Description of Related Art

The Internet has become a major platform for distributing and sharing information, and has been used for, e.g., online shopping, auction, photo album sharing and social networking. When using these services, users may search a website for goods, services or people they are interested in, e.g., an auction item, a hotel in a particular area or a classmate. Currently available systems mainly focus on interactions between parties with opposing purposes, e.g., a supplier and a consumer, or a buyer and a seller. Although a buyer may look at comments on products or services left previously by other buyers, there is no effective way for the buyer to directly communicate with other buyers.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

Internet users may form one or more online communities based on their common search interests. For example, users looking for a hotel in downtown New York on a travel website may form an online community "downtown New York hotels," and users looking for a bag on an auction website may form an online community "bag" or "purse". A user looking for a product or service may make more informed and objective decisions if he can directly hear from other users looking for similar products or services.

The present invention provides a method which may allow users, who are looking for similar products or services on a website and thus belong to an online community, to directly communicate with each other. The method may be used in eCommerce, e.g., online shopping or online auctions. The method may also be used in other contexts, such as social networking and online photo albums. The invention may be carried out by computer-executable instructions stored in a memory, such as program modules. Advantages of the present invention will become apparent from the following detailed description.

Figure 1:
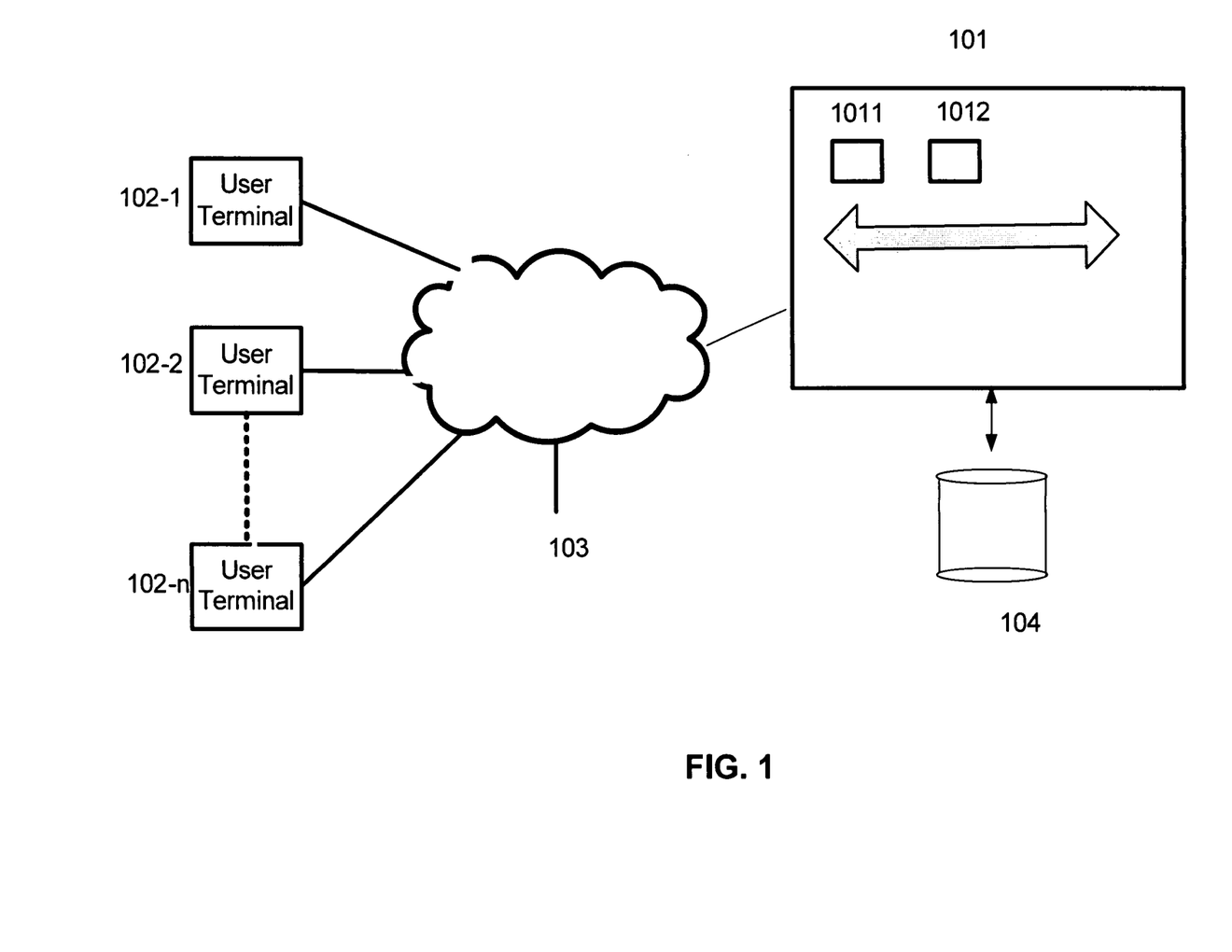
FIG. 1 illustrates a system for sharing information in an online community according to one embodiment of the present invention.

FIG. 1 illustrates a system for sharing information in an online community according to one embodiment of the present invention. As shown, an Internet server 101 may communicate over a network 103 with a number of user terminals 102-1, 102-2, . . . 102-n. The Internet server 101 may be a computer system and may control the operation of a website, which may provide a certain type of service, e.g., online shopping, online auction, social networking or online photo albums. The Internet server 101 may include one or more of a screen, an input device, a processing unit 1011, memory devices 1012, and a system bus coupling various components in the computer system. A community information sharing module may be stored in one of the memory devices 1012 for controlling the processing unit 1011 to process information sharing in an online community, including but not limited to the processes shown in FIGS. 2-4.

The Internet server 101 may access a database 104 which may store data relevant to the service provided by the website, e.g., information about items to be sold, items to be auctioned, people in a social network or photos in online photo albums. The database 104 may also store information about users of the website, e.g., user names, graphical representations, browsing histories, etc. It should be understood that information about users may be stored in a separate database.

The user terminals 102 may be personal computers, handheld or laptop devices, microprocessor-based systems, set top boxes, or programmable consumer electronics. Each user terminal may have a browser application configured to receive and display web pages, which may include text, graphics, multimedia, etc. The web pages may be based on, e.g., HyperText Markup Language (HTML) or extensible markup language (XML).

Network connectivity may be wired or wireless, using one or more communications protocols, as will be known to those of ordinary skill in the art.

Figure 2:
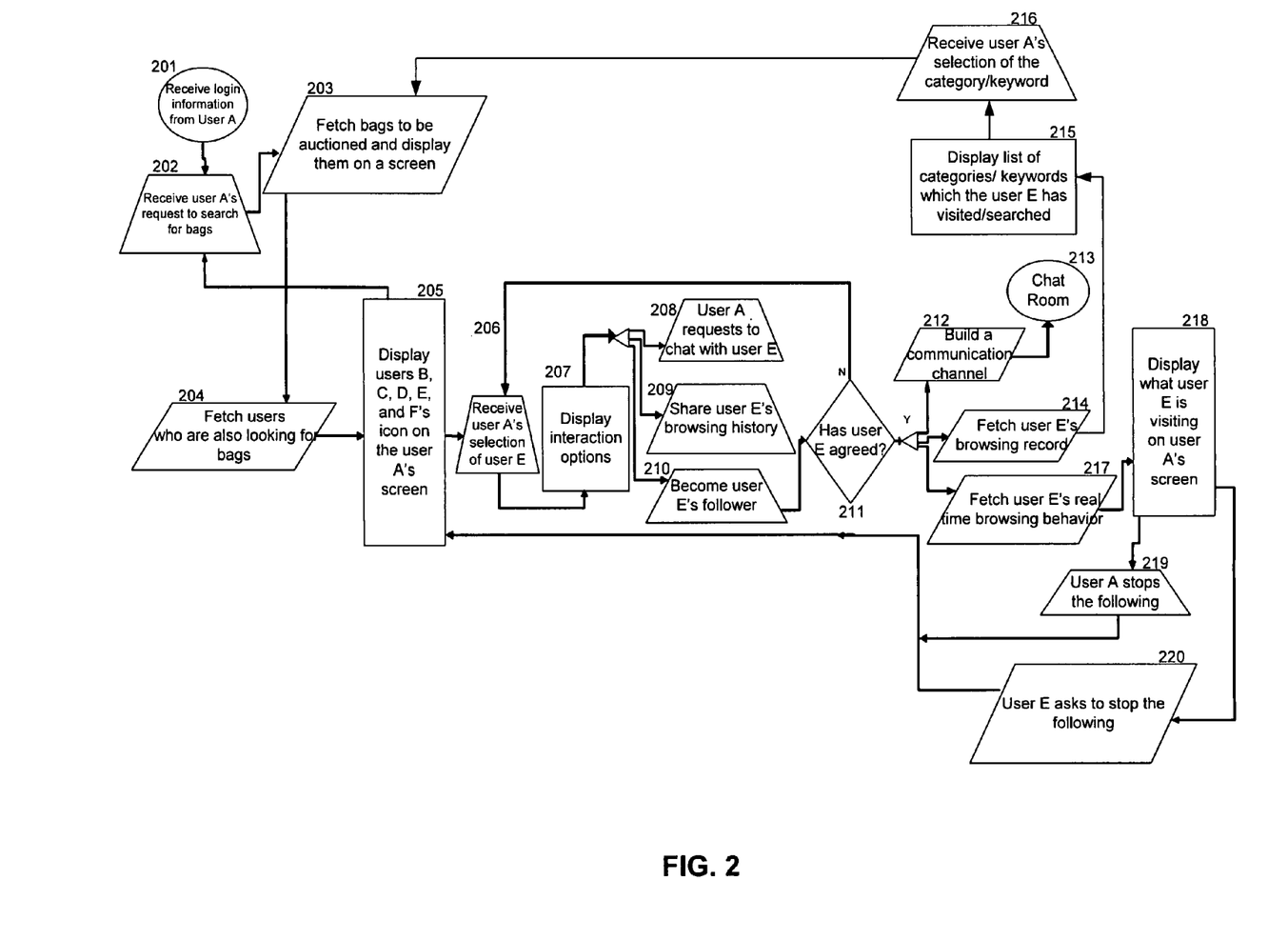
FIG. 2 illustrates a flowchart of a method for sharing information in an online community according to one embodiment of the present invention.

FIG. 2 illustrates a flowchart of a method for sharing information among users of an auction website W according to one embodiment of the present invention. The method of FIG. 2 may be used by buyers to share information about auction items in a system shown in FIG. 1. A user A may have registered with the auction website W to use its services. During the registration, the user A may select his user name and graphic representation. Such information may be stored in the database 104.

Figure 5A:
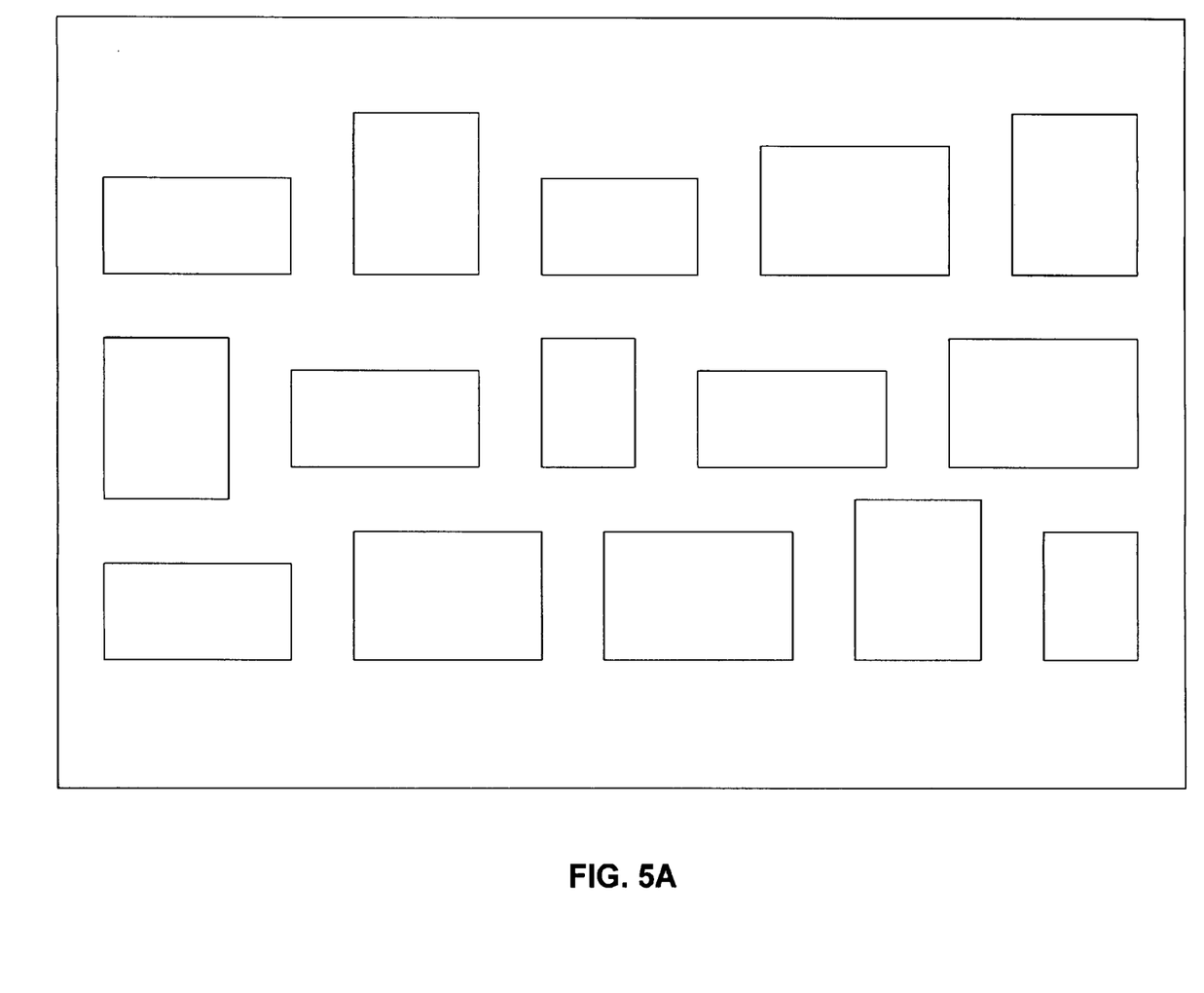
FIGS. 5A-5H illustrate screenshots of a method for sharing information in an online community according to one embodiment of the present invention.

The user A may want to buy a bag, and may log into the auction website W at 201 and start browsing. Items to be auctioned on the website may be displayed on a web page, as shown in FIG. 5A.

Figure 5B:
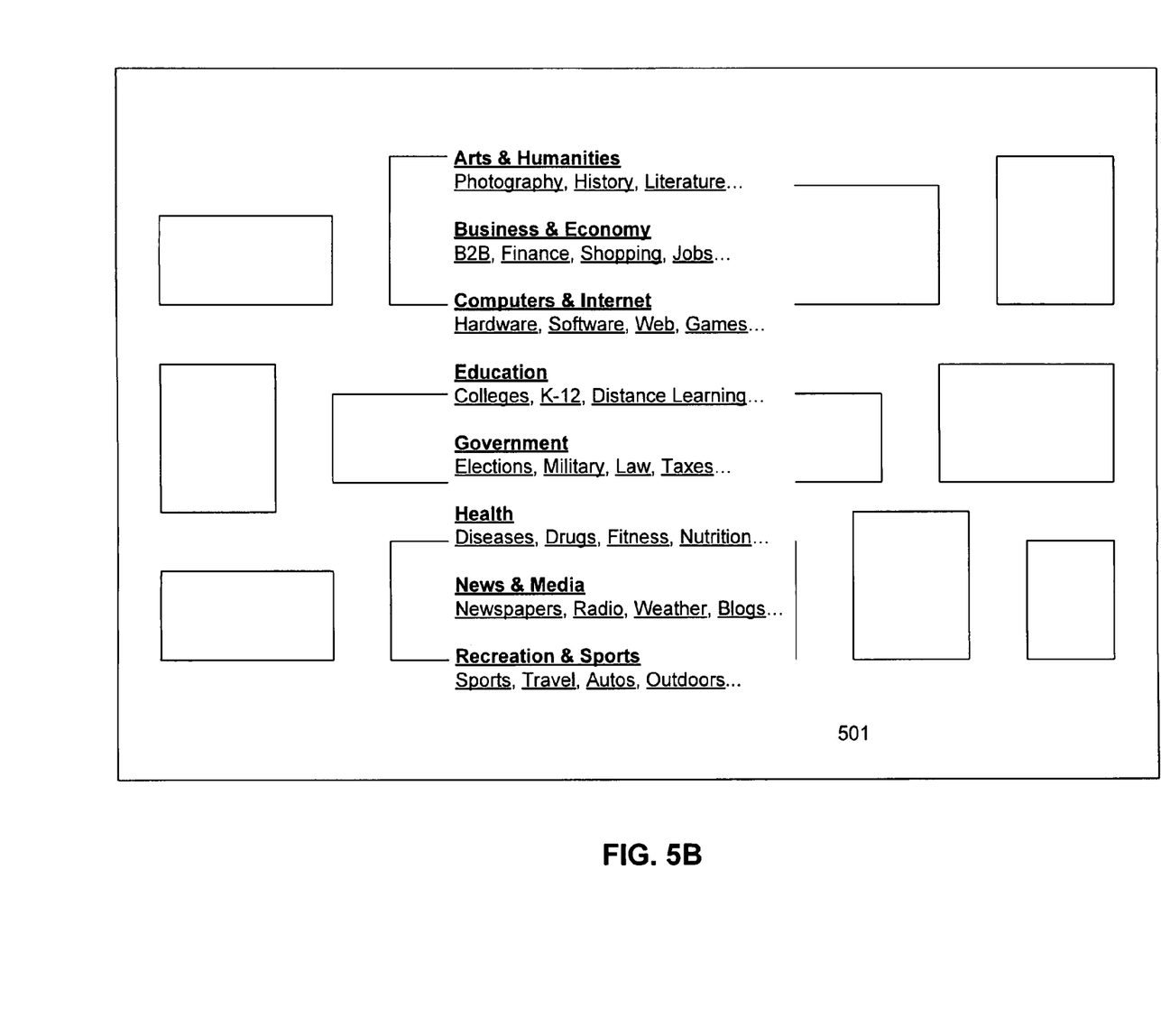

To get more quickly to the item he is interested in, at 202, the user A may press a button on the web page to display a category of items to be auctioned. A category 501 may be displayed on the web page the user A is looking at, as shown in FIG. 5B. The user A may navigate through the category to get to his target: the sub-category for bags.

Figure 5C:
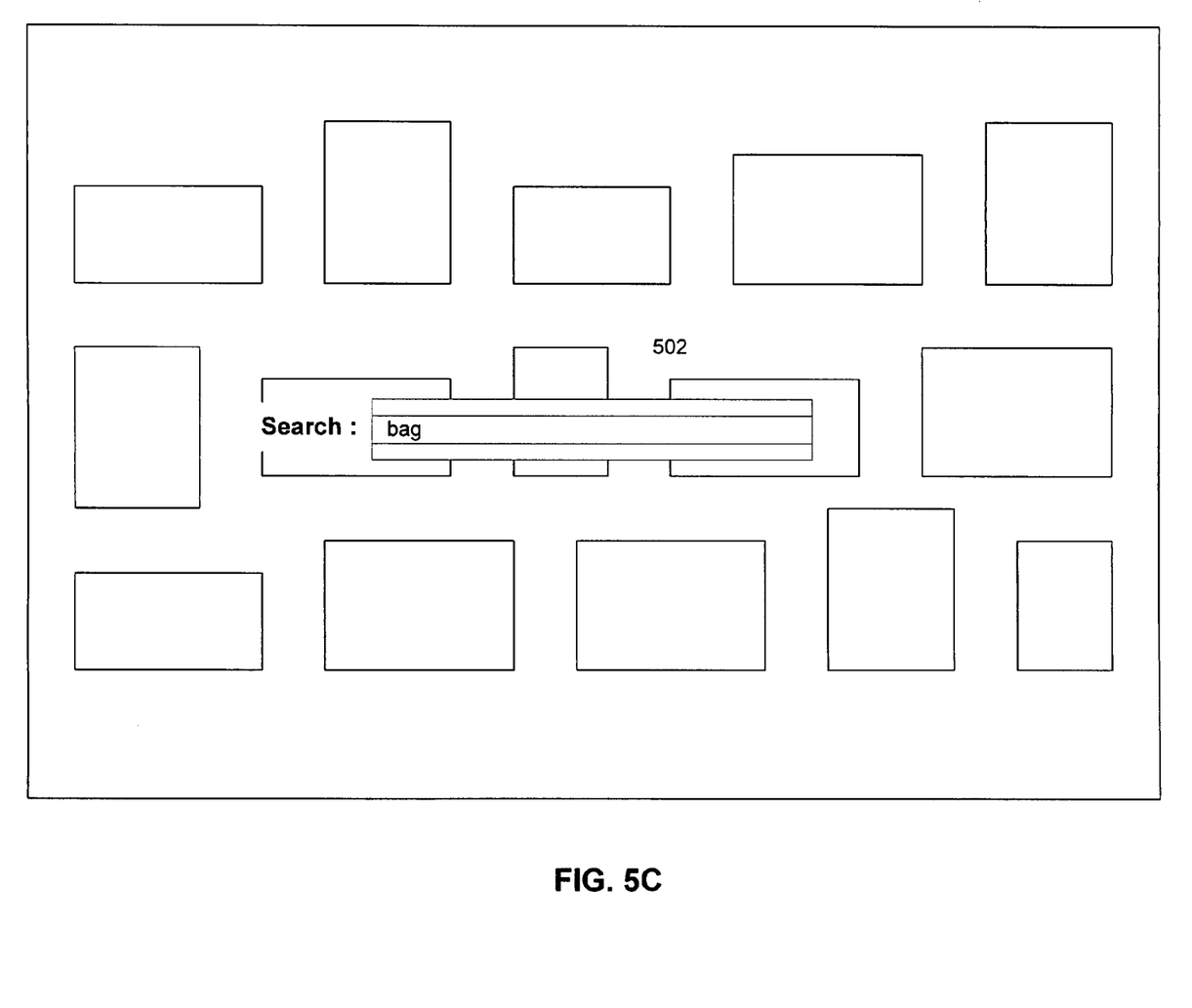

Alternatively, the user A may press another button on the web page to display a search box. A search box 502 may be displayed on the web page the users A is looking at, as shown in FIG. 5C. The user A may type the word "bag" in the search box.

At 203, the server 101 may search the database 104, fetch bags to be auctioned, and display the fetched bags on a screen.

At 204, the server 101 may record in the database 104 that the user A is looking for bags, and may access data in the database 104 to determine whether there are other users who are also looking for bags. The server may determine that users B, C, D, E and F are also looking for bags. The server 101 may fetch information about users B, C, D, E and F, e.g., their user names and graphical representations. It should be understood that search requests from users B, C, D, E and F do not need to be exactly the same as the search request from the user A, and only need to have some overlap with the search request from the user A. For example, the user C may be searching for LV speedy, and the user D may be looking for tote. Since both LV speedy and tote belong to the larger group "bags," the server 101 may determine that users C and D are looking for bags, and regard them as members of the online community "bag."

Figure 5D:
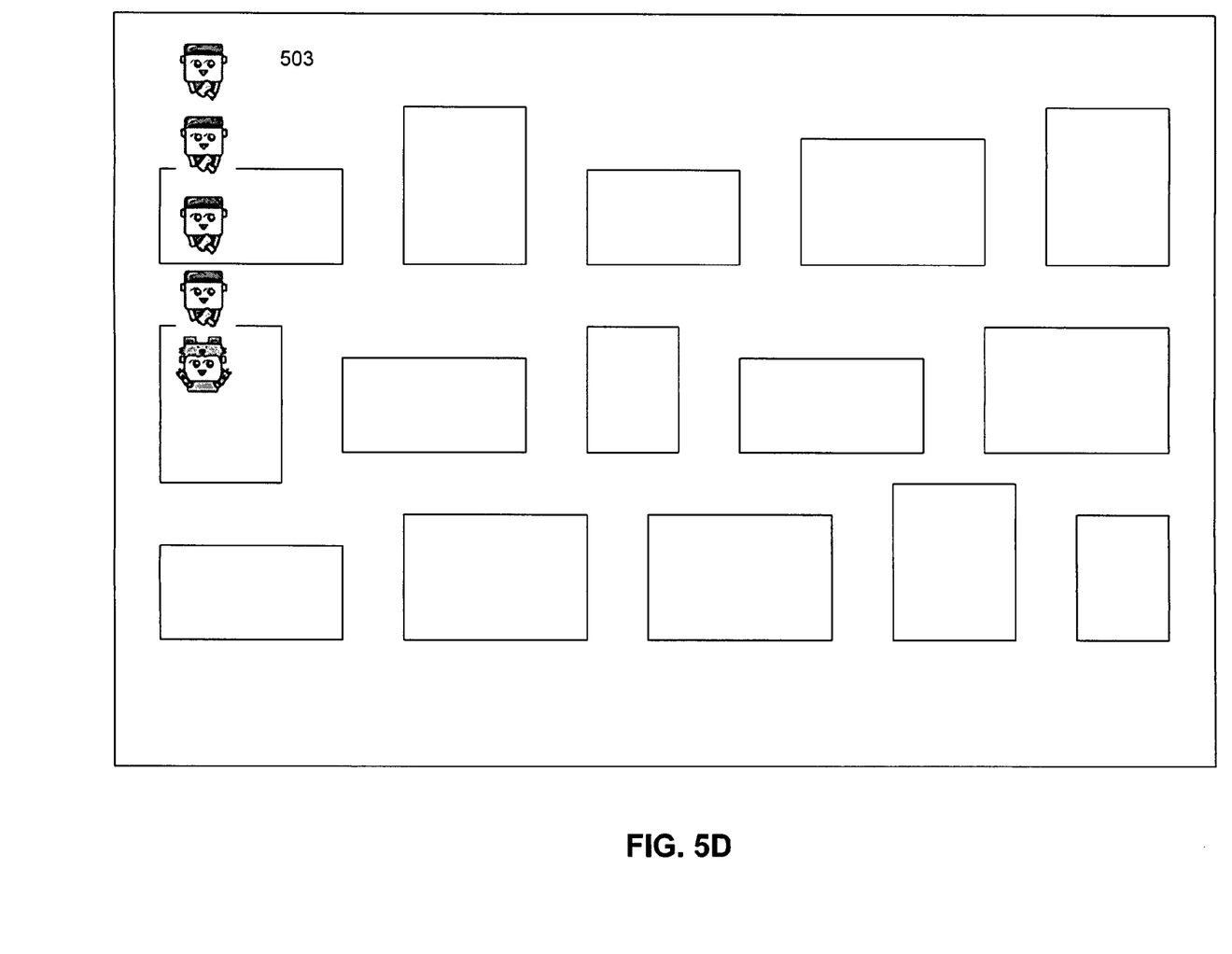

At 205, user names or graphical representations 503 of users B, C, D, E and F may be displayed on the screen that the user A is looking at, as shown in FIG. 5D. At the same time, the user name or graphical representation of the user A may be displayed on screens that the users B, C, D, E or F are looking at.

If the user A is interested in sharing information with users B, C, D, E or F, he may click on the user name or graphical representation of that user at 206.

At 207, an option menu may be displayed, so that the user A may select how to interact with a selected user, e.g., the user E. One option is to invite the user E to chat, so that users A and E can share information about bags. Another option is to ask the user E to share his browsing history about bags, e.g., the keywords the user E used, the brands the user E searched, etc. A further option is to ask the user E to accept the user A as a follower so that the user A can follow the user E to look at bags the user E is looking at.

The user A may select one of the options at 208, 209 or 210, and server 101 may determine whether the user E has agreed to interact with the user A at 211. If the user E has rejected the user A's request, the user A may be so informed, and the process may return to 206 so that the user A may select another user to share information with.

Figure 5E:
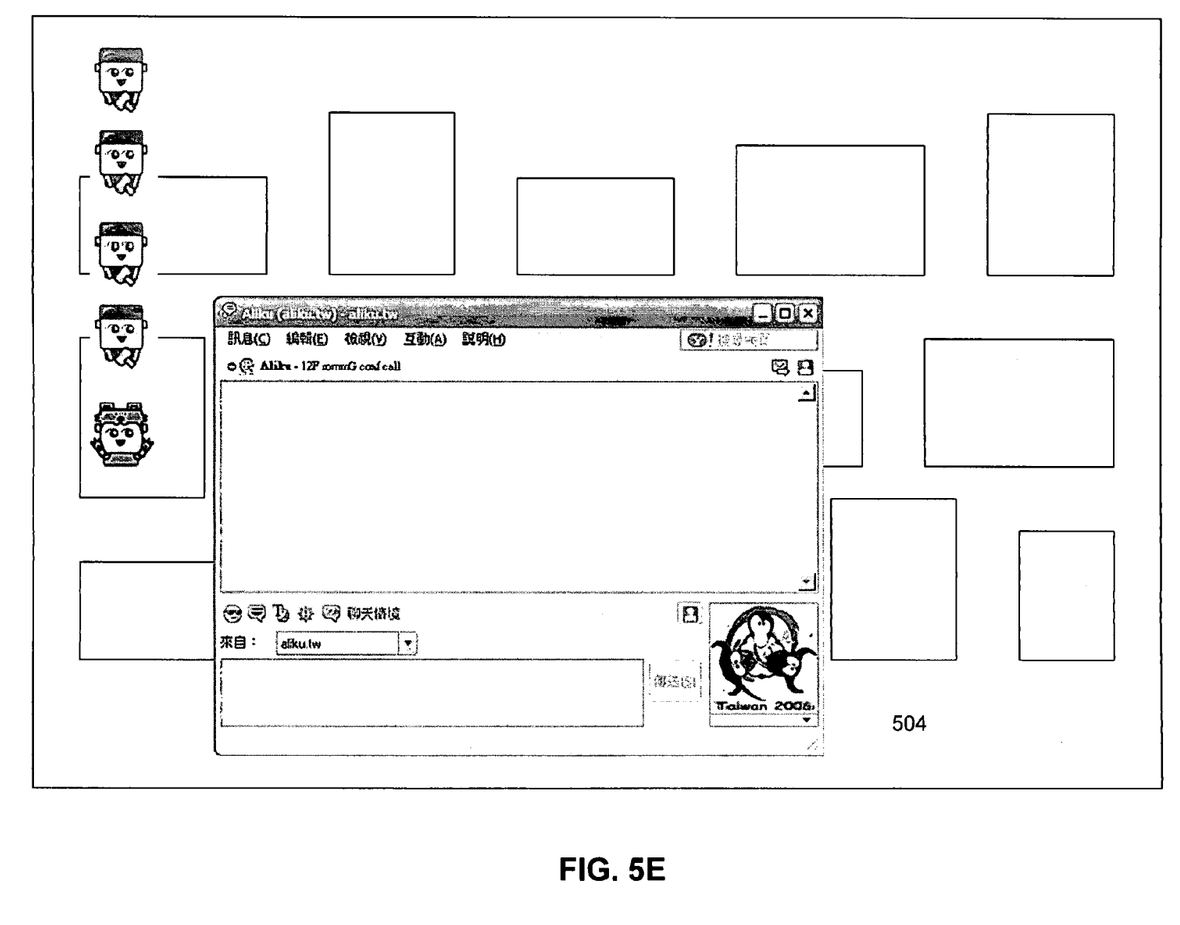

If the user A selects to chat with the user E at 208, and the user E has accepted the request at 210, the server 101 may build a communication channel between users A and E at 212. In one embodiment, users A and E may enter a chat room at 213 and chat via a text message window 504 on the user A's screen, as shown in FIG. 5E. In another embodiment, users A and E may chat over an IP phone connection set up by the server 101. By communicating with users who are also looking for bags, the user A may get these users' opinions about a brand, a type of bag, or a store, and may make more informed and objective decisions.

Figure 5F:
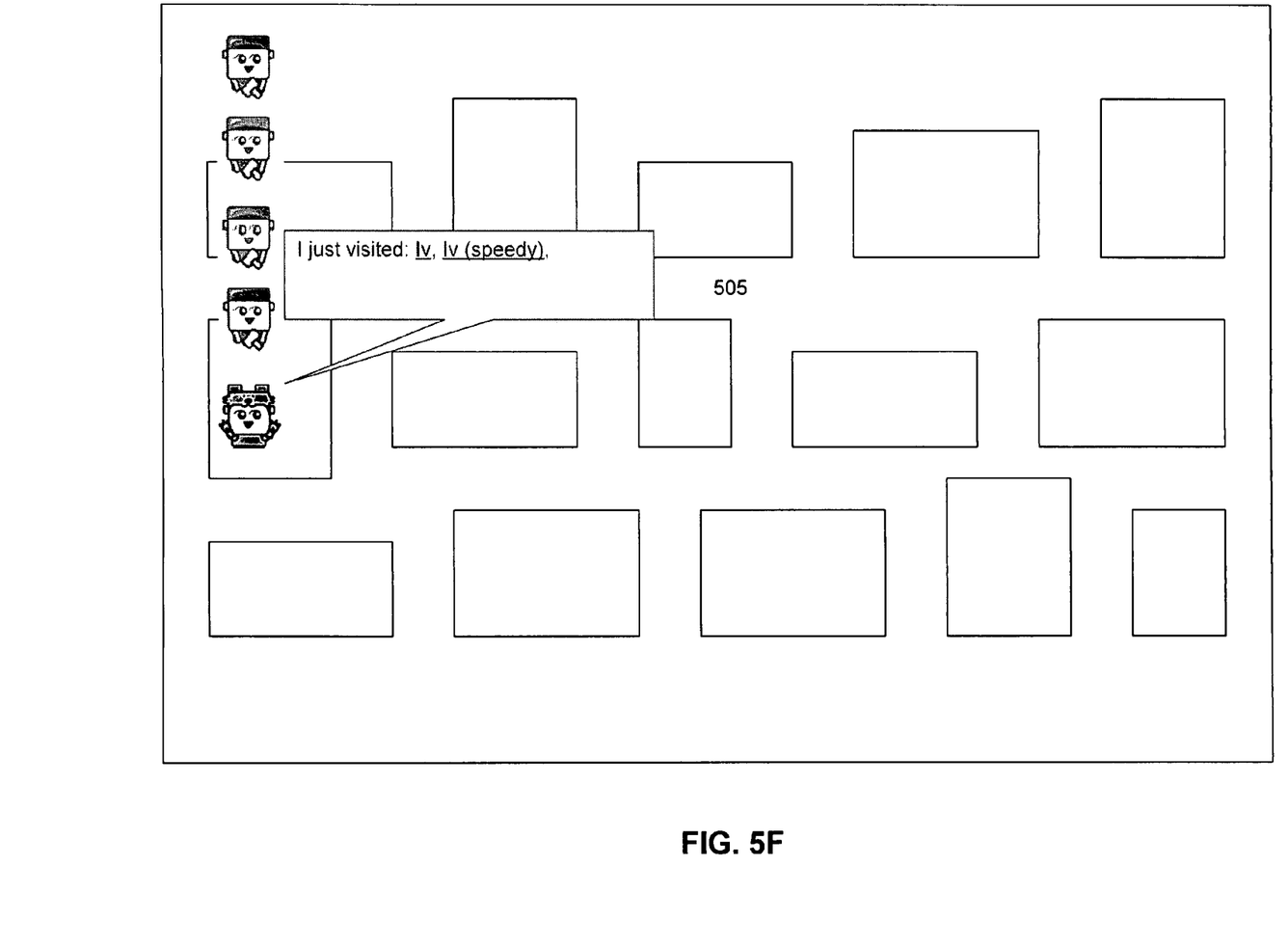

If the user A requests to share the user E's browsing history about bags at 209, and the user E has agreed at 211, the server 101 may fetch the user E's browsing record from the database 104 at 214, and display in a pop-up window on the user A's screen categories the user E has visited, keywords the user E has used, or the bags the user E has viewed at 215. As shown in FIG. 5F, the keywords that the user E has searched may be displayed in a balloon 505 and may include: LV, LV speedy. If the user A clicks on any of these keywords at 216, the process may return to 203, and the server 101 may fetch auction items matching the user E's keywords. In another embodiment, the server 101 may simply display auction items which are related to the categories or keywords the user E has used. The user A may have selected a too narrow sub-category, input a wrong keyword, missed a brand, or input too many keywords in the search box. By looking at the user E's browsing history, the user A may either broaden his search and look at more bags, or narrow his search and look at bags he may really like.

If the user A selects to be a follower of the user E at 210, and the user E has agreed at 211, the server 101 may fetch the user E's real time browsing behavior at 217. At 218, the server 101 may display bags the user E is looking at in a pop-up window on the user A's screen. Since users A and E are both interested in bags, the user A may stop his own browsing and simply look at what the user E has looked at. In addition, the user E may be more experienced, and the user A may be able to look at items he himself could not find. The follower mode may stop if the user A asks to stop at 219 or the user E asks to stop at 220. The follower mode also may automatically stop if either the user A or the user E logs off the website W. The process may then return to 205.

If the user A is happy with a bag displayed on his screen, he may click on it, and the bidding/buying process may start.

It should be understood that other processes may be used to make browsing easier. For example, the user A may drag the screen to the right to see new auction items, or drag the screen to the left to go back to auction items previously displayed.

Figure 3:
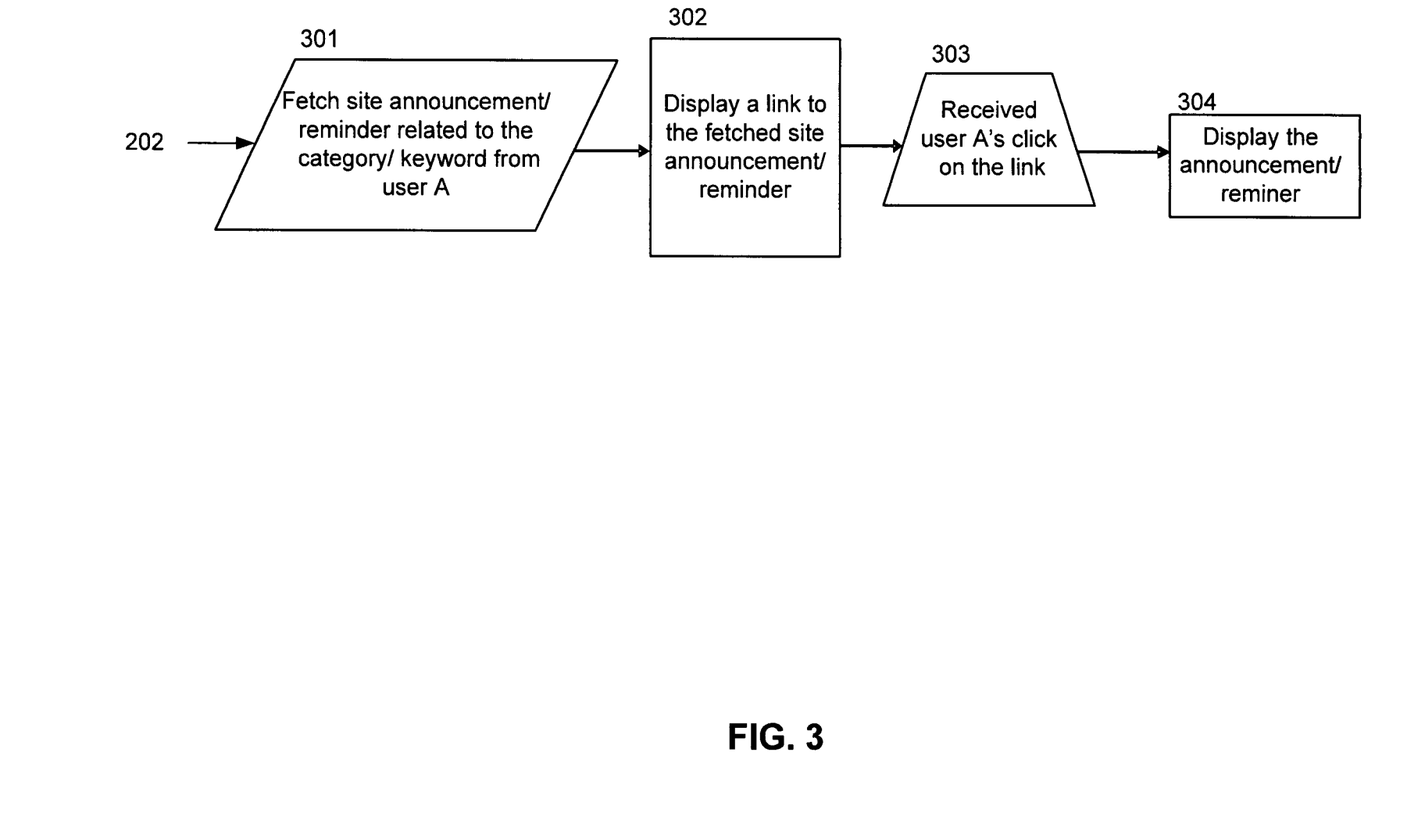
FIG. 3 illustrates a flowchart of a method for sharing information in an online community according to one embodiment of the present invention.

FIG. 3 illustrates a flowchart of a method for sharing information in an online community according to one embodiment of the present invention. The method of FIG. 3 may be used in the system shown in FIG. 1 by an administrator of an auction website to display reminders or announcements to users, and may be used together with the method shown in FIG. 2.

After receiving the user A's search request at 202, which may include the category the user A is interested in or the keyword(s) he input, at 301, the server 101 may fetch a site announcement or reminder related to auction items the user A is looking at. The announcement or reminder may ask users to be careful about scams or fraud.

At 302, the server 101 may display, in a pop-up window on the user A's screen, a link to the fetched announcement or reminder.

Figure 5G:
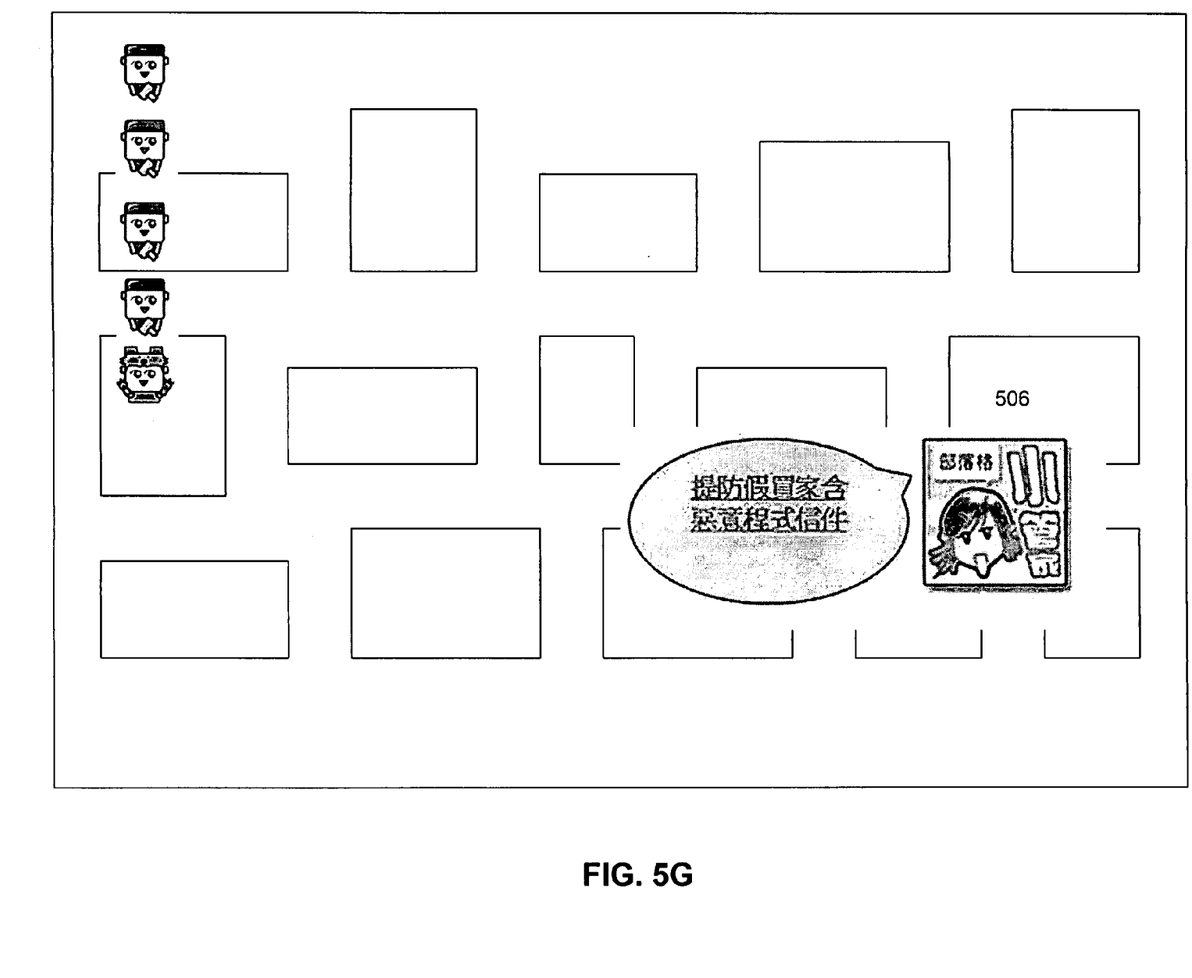

If the user A clicks on the link at 303, the announcement or reminder 506 may be displayed at 304, as shown in FIG. 5G.

In one embodiment, a user of the website W may enter into an agreement with an advertiser and agree to carry the advertiser's advertisement when he is browsing the website W. Consequently, the advertisement may be displayed on screens shown in FIGS. 5D-5H together with the user's user name or graphical representation. The method for enabling a user to carry an advertisement and displaying the advertisement is described in the co-pending U.S. patent application Ser. No. 12/195,332, entitled Advertising in an Online Community, which is incorporated herein by reference in its entirety.

Figure 4:
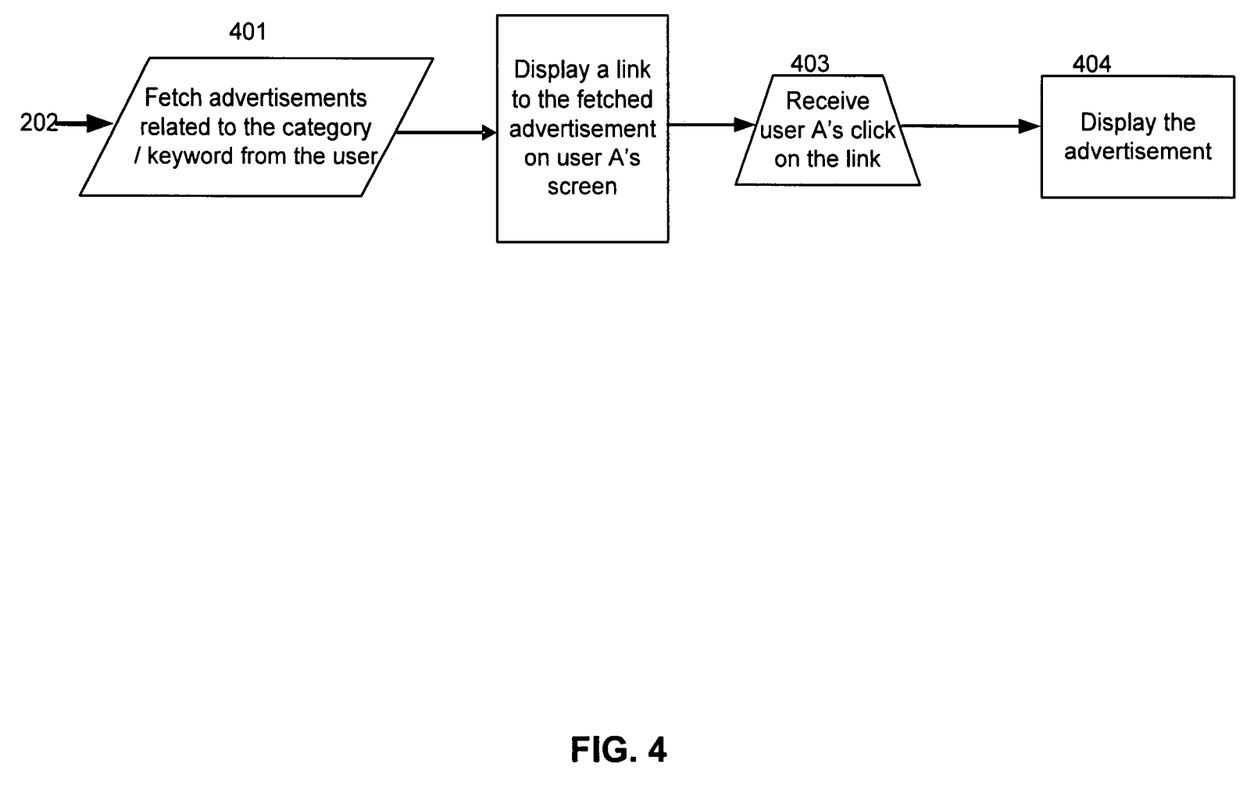
FIG. 4 illustrates a flowchart of a method for sharing information in an online community according to one embodiment of the present invention.

FIG. 4 illustrates a flowchart of a method for displaying targeted advertisements in an online community according to one embodiment of the present invention. The method shown in FIG. 4 may be used in the system shown in FIG. 1 and may be used together with the method shown in FIG. 2.

Advertisers may enter into agreements with the website W to have their advertisements displayed on web pages of the website W. Information about the advertisers, their advertisements and their contract terms with the website W may be stored in the database 104. It should be understood that such information may be stored in a separate database as well.

After receiving the user A's search request at 202, which may include the category the user A is interested in or the keyword(s) he input, at 401, the server 101 may search the database 104 to find out whether there are advertisements related to the category or keywords, and if yes, fetch the advertisements.

At 402, a link to a fetched advertisement may be displayed on the user A's screen.

Figure 5H:
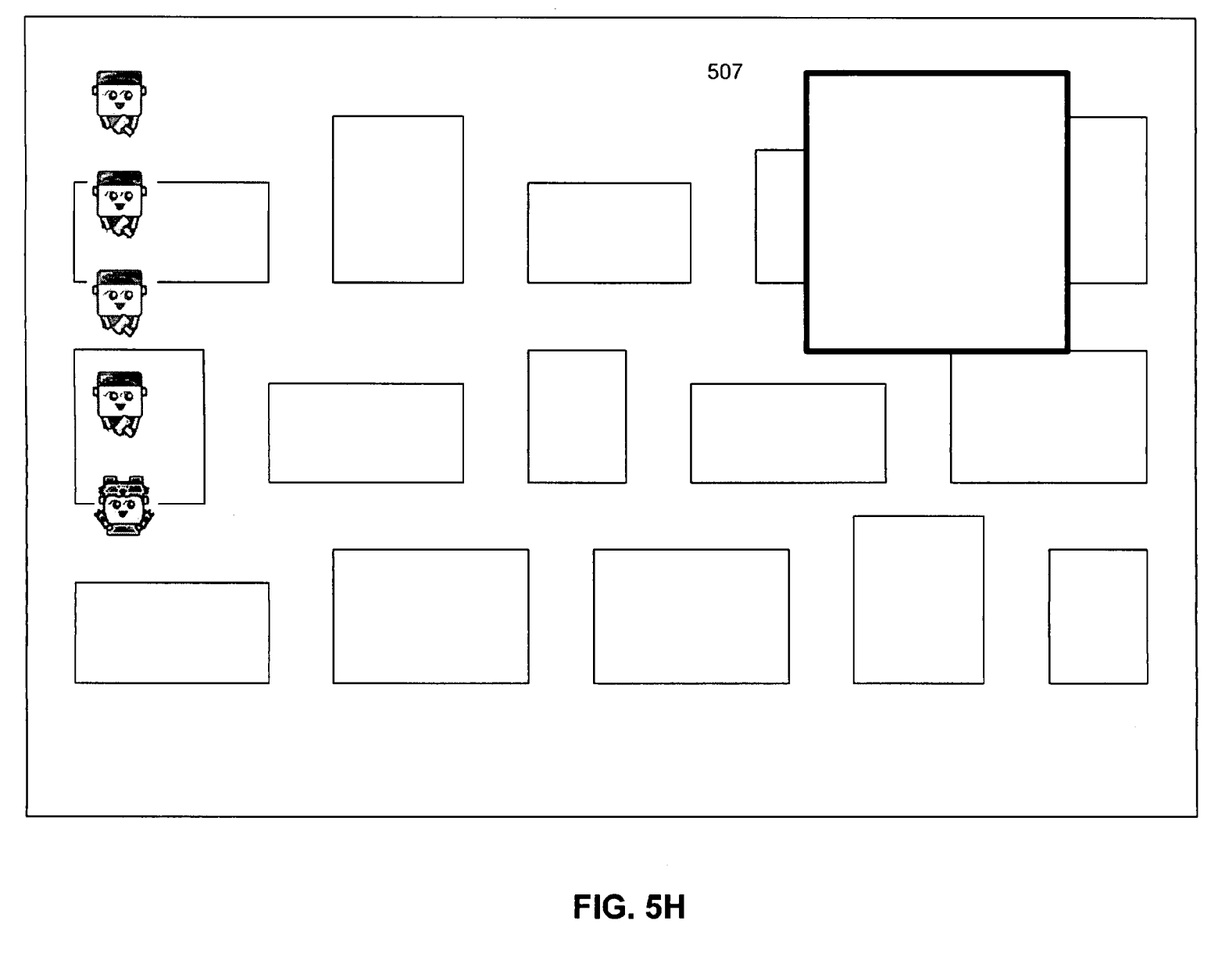

If the user A clicks on the link at 403, the advertisement 507 may be displayed at 404, as shown in FIG. 5H.

Since the advertisement is related to category or keyword from the user A, it is more likely that the user A may be interested in the advertisement.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method for sharing information in an online community which has at least two users, the method comprising:
receiving a first search request to search a website from a first user;
obtaining a list of search results matching the first search request;
causing the list of search results to be displayed on a screen of the first user;
searching for a plurality of associated users who search the website with search requests, each of which has a scope that at least partly overlaps with a scope of the first search request;
providing, to the first user, a plurality of options with respect to each of the associated users, wherein a plurality of options with respect to an associated user include an option that allows the first user to request to follow the associated user and the associated user is displayed to the first user to facilitate the first user to select the option to follow; and
when the first user selects the option to follow the associated user and is accepted by the associated user as a follower, causing information about real time browsing activities of the associated user to be displayed on the screen of the first user.

2. The method of claim 1, further comprising:
determining whether a request from the first user requests to share information with the associated user.

3. The method of claim 2, further comprising:
providing a representation of the second user with which the first user requests to share information with the associated user.

4. The method of claim 2, wherein the request from the first user to share information with the associated user is sent over a communication channel.

5. The method of claim 4, wherein the communication channel is a text message channel.

6. The method of claim 4, wherein the communication channel is a voice channel.

7. The method of claim 2, further comprising:
providing a browsing history of the associated user in response to the request from the first user requesting to share information with the associated user through sharing the browsing history of the associated user.

8. The method of claim 7, further comprising:
causing information about the browsing history of the associated user to be displayed on the screen of the first user.

9. The method of claim 1, further comprising:
stopping displaying information about the real time browsing activities of the associated user on the screen of the first user in response to receipt of a request to stop the displaying of the information from the first user or the associated user.

10. The method of claim 1, further comprising:
determining whether an agreement is received from the associated user to accept the request to share information from the first user.

11. The method of claim 1, further comprising:
causing a representation of the first user to be displayed on a screen of the associated user.

12. The method of claim 1, wherein the representation is a graphical representation.

13. The method of claim 1, further comprising:
enabling moving a search result on the screen of the first user by dragging the screen of the first user.

14. The method of claim 1, further comprising:
causing an administrator announcement or reminder related to the first search request to be displayed on the screen of the first user.

15. The method of claim 1, further comprising:
causing an advertisement related to the first search request to be displayed on the screen of the first user.

16. The method of claim 1, further comprising:
stopping the first user from being a follower of the associated user in response to at least one of the first user and the associated user logging off the website.

17. A system for information sharing in an online community which has at least two users, the system comprising:
a computer system which runs a website and is coupled to a computer network; and
a database,
wherein the computer system:
receives a first search request to search the website from a first user;
obtains a list of search results matching the first search request;
causes the list of search results to be displayed on a screen of the first user;
searches for a plurality of associated users who search the website with search requests, each of which has a scope that at least partly overlaps with a scope of the first search request;
provides, to the first user, a plurality of options with respect to each of the associated users, wherein a plurality of options with respect to an associated user include an option that allows the first user to request to follow the associated user and the associated user is displayed to the first user to facilitate the first user to select the option to follow; and
when the first user selects the option to follow the associated user in is accepted by the associated user as a follower, cause information about real time browsing activities of the associated user to be displayed on the screen of the first user.

18. The system of claim 17, wherein the computer system further:
determines whether the first user requests to share information with the associated user.

19. The system of claim 18, wherein the computer system further:
establishes a communication channel between the first user and the associated user.

20. The system of claim 18, wherein the computer system further:

determines whether the associated user agrees to accept the request to share information from the first user.

21. A computer program product comprising a computer-readable memory having instructions which, when performed by a computer, perform a method for sharing information in an online community which has at least two users, the method comprising:

receiving a first search request to search a website from a first user;

obtaining a list of search results matching the first search request;

causing the list of search results to be displayed on a screen of the first user;

searching for a plurality of associated users who search the website with search requests, each of which has a scope that at least partly overlaps with a scope of the first search request;

providing, to the first user, a plurality of options with respect to each of the associated users, wherein a plurality of options with respect to an associated user include an option that allows the first user to request to follow the associated user and the associated user is displayed to the first user to facilitate the first user to select the option to follow; and when the first user selects the option to follow an associated user and is accepted by the associated user as a follower, causing real time browsing activities of the associated user to be displayed on the screen of the first user.

* * * * *